Aug. 25, 1970      D. W. BARTON      3,525,564
REARVIEW MIRROR POSITIONING MECHANISM
Filed Aug. 28, 1968
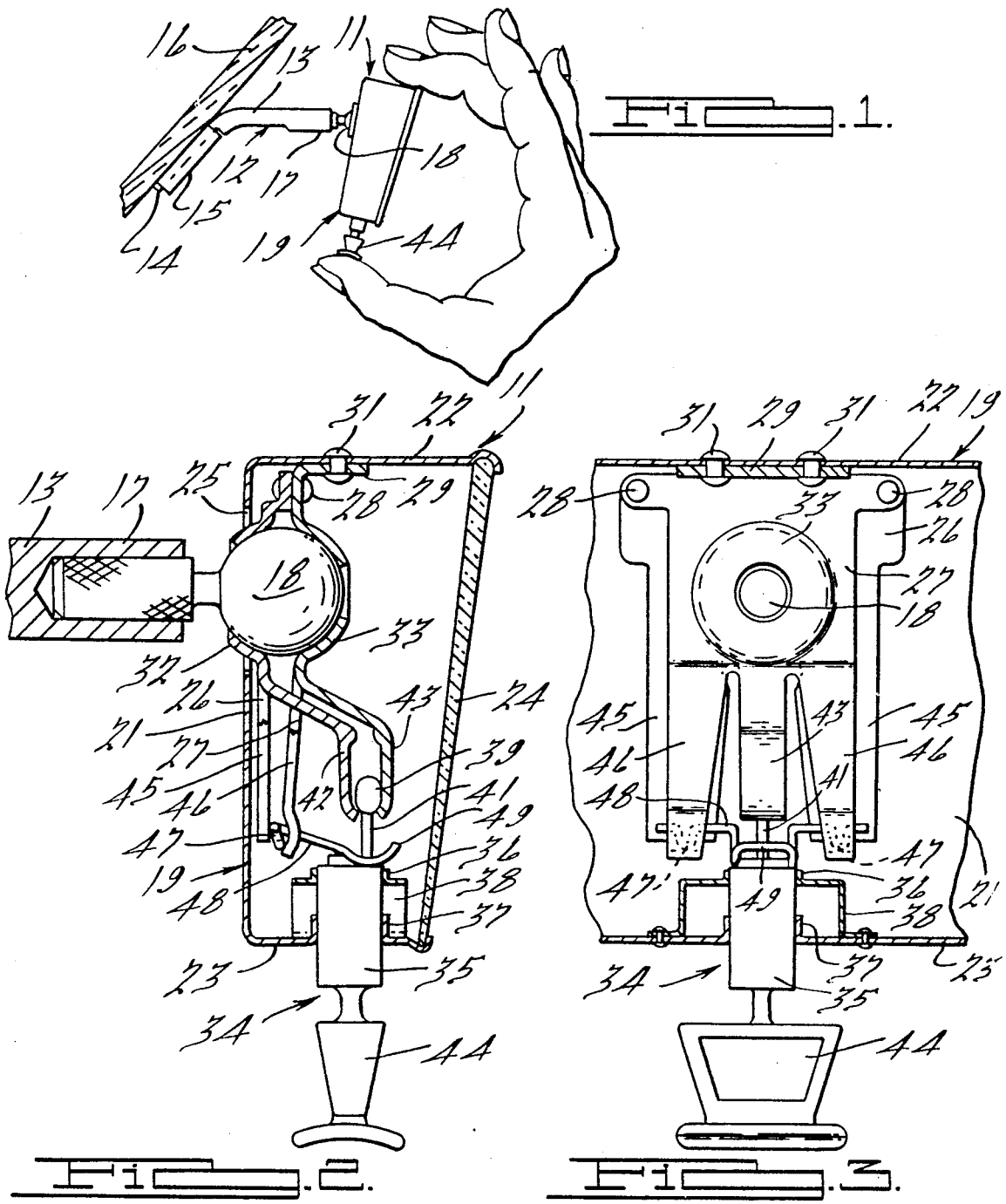
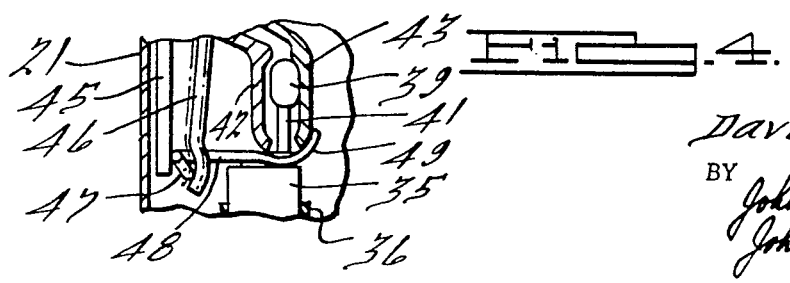
INVENTOR.
David W. Barton
BY John R. Faulkner
John J. Roethel
ATTORNEYS.

United States Patent Office 3,525,564
Patented Aug. 25, 1970

3,525,564
REARVIEW MIRROR POSITIONING
MECHANISM
David W. Barton, Birmingham, Mich., assignor to Ford
  Motor Company, Dearborn, Mich., a corporation of
  Delaware
Filed Aug. 28, 1968, Ser. No. 755,852
Int. Cl. G02b 17/00
U.S. Cl. 350—281                               4 Claims

ABSTRACT OF THE DISCLOSURE

A vehicle multi-position day-night rearview mirror assembly mounted on a ball-type supporting member. The assembly includes a dual purpose adjusting means rotatably actuatable to shift the casing and thereby the rearview mirror relative to the ball-type supporting member to change the angle of reflection to and from day and night positions. The adjusting means is also selectively slidably actuatable to release the pressure of gripping plates on the ball of the ball-type supporting member to permit universal adjustment of the rearview mirror assembly.

BACKGROUND OF THE INVENTION

Many vehicle interior rearview mirrors are supported on a ball and socket mounting system in which the ball socket clamps derive their clamping action through adjusting screws. Complaints have arisen that the rearview mirror assembly fails to hold its adjusted position once set by the driver. This dissatisfaction is further compounded when an attempt is made to increase the clamping pressure. The adjusting screws are awkward to reach and often break or strip threads when excessive tightening torque is applied. Further difficulty arises because as the screws are tightened to overcome wear, the very increase in load accelerates the wear. Thus, continued driver dissatisfaction is generated.

It has been proposed in the prior art, as exemplified by U.S. Pats. 2,969,714 and 3,339,877, to provide spring pressure to the clamp socket element instead of adjusting screw applied pressure. Manual devices are provided to relieve the spring pressure when it is desired to adjust the mirror on the supporting ball member.

It is an object of the present invention to provide not only the spring clamping action but also to incorporate in the same actuating mechanism for releasing the spring pressure a mechanism for providing a day-night feature. The day-night feature, as is well known, involves changing the angle of reflection of the mirror element to diminish the glare from the headlights of a following vehicle during night travel.

SUMMARY OF THE INVENTION

The vehicle multiple position day-night rearview mirror assembly embodying the present invention comprises a ball-type supporting member on which is supported a casing comprising a rear wall, an upper wall, a lower wall and an open front face. The ball-type supporting member projects through an aperture in the casing rear wall and a mirror element is mounted in the open front face. A pair of plates are suspended from the upper casing wall, at least one of which is a preloaded spring clamp. The plates have opposed semi-spherical seats and frictionally grip the ball of the ball-type supporting member between said seats to immovably maintain the casing on the ball-type supporting member. A mirror reflection angle adjustment means is rotatably and axially slidably journalled in the lower wall of the casing and has an operating member projecting outwardly of the casing.

The angle adjustment means is coupled to the plates so that upon rotation by the operating member the angle of the casing and thereby of the mirror is changeable from a first position to a second position relative to the plates. The respective reflective positions of the mirror are commonly referred to as the day position and the night position.

Interposed between at least one of the plates and the angle adjustment means is a plate separating means. An important feature of the present invention is that the plate separating means is responsive to axial movement of the adjustment means above described upon movement of the operating member toward the casing. Movement of the plates from their normal position relative to each other results in a diminished grip of the spring plate on the ball. This permits substantially universal adjustment of the rearview mirror assembly bodily as a unit about the ball. Thus, actuation of only a single operating member is necessary to obtain day-night positioning or substantially universal positioning of the mirror assembly.

DESCRIPTION OF THE DRAWING

Other objects, advantages and features of the present invention can be made more apparent as this description proceeds, reference being had to the accompanying drawing, wherein:

FIG. 1 is a fragmentary side elevational view illustrating a rearview mirror assembly embodying the present invention as it appears when mounted on a surface such as a windshield surface and as it is gripped for substantially universal adjustment;

FIG. 2 is a vertical section of the mirror assembly;

FIG. 3 is a fragmentary view in part sectional of the mirror assembly illustrating the components as they would appear with the mirror removed; and FIG. 4 is a fragmentary sectional view illustrating parts of the mechanism shown in FIG. 2 in a second operative position.

DETAILED DESCRIPTION OF THE INVENTION

Referring now to the drawing, the rearview mirror assembly generally designated 11, is adapted to be mounted within the interior of a vehicle compartment. As illustrated, the mirror assembly 11 is supported on a ball-type supporting member 12 comprising an inverted L-shaped strut 13 having its lower end 14 attached to a bracket 15 which is cemented to the inner surface of a windshield 16. The upper end 17 the support strut 13 carries a ball 18 about which the mirror assembly is substantially universally adjustable for the convenience of the vehicle operator.

The mirror assembly 11 consists of a stamped casing or housing 19 having a rear wall 21, an upper wall 22, a lower wall 23 and an open front face into which is fitted a conventional wedge-shaped day-night mirror 24. The ball 18 of the supporting strut 13 projects through an aperture 25 in the rear wall 21.

The mirror casing 19 is supported on the ball 18 by a pair of plates 26 and 27, at least one of which is a clamping spring. As illustrated, the clamping spring plate is the plate 27. The plates 26 and 27 are formed as a sub-assembly by rivets 28 and are suspended through a flange 29 on the spring plate 27 from the upper casing wall 22 by rivets 31.

The plates 26 and 27 have opposed semi-spherical seats 32 and 33, respectively, between which the ball 18 is frictionally gripped. The spring clamping plate 27 is preloaded or flexed to provide sufficient gripping action to hold the mirror casing immovable on the ball. Day-night adjustment of the mirror 24 involves changing its angle of reflection within pre-determined limits. This is accomplished through an angle adjustment means, generally designated 34, which consists of a cylindrical body member 35 journalled in aligned flanged apertures 36 and 37 in a bracket 38 and the lower casing wall 23, respectively.

Projecting upwardly from the cylindrical body member 35 is a knob 39 carried on a rod 41. The knob 39 is eccentrically displaced relative to the axis of rotation of the body member 35. The plates 26 and 27 have spaced opposed offset leg portions 42 and 43 encompassing the knob 39. It will be noticed that the extremities of the leg portions 42 and 43 are inwardly turned so as to prevent vertical withdrawal of the knob 39 thereby preventing displacement of the cylindrical body member from the lower casing wall 23.

Projecting downwardly from the cylindrical body member is an adjusting knob 44 which may be grasped to rotate the cylindrical body member and thereby displace the casing 19 relative to the ball 18. That is, rotation of the angle adjustment means 34 causes the thin metal of the casing 19 to pivot about an axis through rivets 31. Normally, the adjustment means would be rotated 180° to shift the angle of deflection of the mirror 24 from a day to a night position or vice versa.

The mirror assembly must be positioned in the proper sight line for a particular vehicle operator before any utility can be derived from the mirror angle adjustment means 34. It is believed apparent that if sufficient force is exerted on the casing 19 it can be bodily moved about the ball 18 to almost any desired position. The amount of force that would be required would be a function of the frictional resistance of the ball 18 in the plate semispherical seats 32–33 which in turn is related to the force exerted by the clamping spring plate 27. To avoid undue resistance to movement when it is desired to bodily adjust the mirror casing 19 and to minimize frictional wear on the ball 18 and plates 32 and 33, it is desirable that the clamping pressure on the ball 18 be relieved as the casing is adjusted to a new position.

This is accomplished through a plate separating means which consists of at least one pair of opposed depending leg portions 45 and 46 on the plates 26 and 27, respectively. The extremities of the depending leg portions are spaced from each other. Received between the spaced extremities is an end crank portion 47 of a crank means or member 48 having a main crank portion 49 in abutting relation to the upper end of the angle adjustment means cylindrical body member 35. The cylindrical body member 35 has a shoulder 51 which is straddled by the main crank portion 49 to provide lateral restraint for the crank member 48.

Upon the knob 39 being depressed, as by the application of thumb pressure as shown in FIG. 1, the crank 48 is rotated in a counterclockwise direction as viewed in FIG. 2. The resultant camming action of end crank portion 47 on the depending leg portion 46 of the spring clamp plate 27 causes the latter to move from the dot-dash outline position of FIG. 4 to the solid outline position. The spring clamp plate 27 opens away from plate 26 thus reducing the clamping pressure on the ball 18 and permitting easier and more accurate mirror adjustment.

The length of the crank portion 49 from the pivot axis of the crank member 48 is somewhat greater than the length of the crank portion 47 from the pivot axis and this compound leverage keeps the thumb input force to a low and acceptable level. Upon release of the thumb input force, the angle adjustment means 34 is forced downwardly by the force of spring clamping plate 27 on the crank portion 47 of the crank member 48. As the spring clamp plate 47 returns to its preloaded or flexed position, the clamping action on the ball 18 is restored to its desired level.

As was noted earlier, the curved end portions of the offset leg portions 42 and 43 of the plate members 26 and 27, respectively, prevent the knob 39 from passing between the depending leg portions and thus restrains the angle adjustment means 34 from falling out of the mirror assembly.

It is to be understood that this invention is not limited to the exact construction illustrated and described above, but that various changes and modifications may be made without departing from the spirit and scope of the invention as defined in the appended claims.

I claim:
1. A multiple position day-night rearview mirror assembly comprising:
   a ball-type supporting member,
   a casing comprising a rear wall, an upper wall, a lower wall and an open front face,
   said ball-type supporting member projecting through an aperture in said casing rear wall,
   a mirror element mounted in said open front face,
   a pair of plates suspended from said upper wall and at least one of which is a preloaded spring clamp,
   said plate separating link means being responsive to the ball of said ball-type supporting member being frictonally gripped between said seats to immovably maintain said casing on said ball-type supporting member,
   mirror reflection angle adjustment means having a cylindrical body portion rotatably and axially slidably journalled in the lower wall of said casing and having an operating member projecting outwardly of said casing,
   said angle adjustment means including eccentric means interposed between said plates operative upon rotation of said operating member to change the angle of said casing and thereby said mirror from a first position to a second position relative to the plates,
   and plate separating link means interconnected between said angle adjustment means and said plates,
   said plate separating link means being responsive to axial movement of said adjustment means upon movement of said operating member toward said casing to separate the plates to diminish the grip of the latter on said ball to permit substantially universal adjustment of said rearview mirror assembly bodily as a unit about said ball.

2. A multiple position day-night rearview mirror assembly according to claim 1, in which:
   the eccentric means of the angle adjustment means comprises a cylindrical body member havng an axial extension projecting eccentrically of the axis of rotation, and
   the plates have spaced opposed offset leg portions encompassing the end of the axial extension,
   the eccentric movement of said axial extension from a first position to a second position upon rotation of the angle adjustment means causing repositioning of the casing relative to the plates to change the reflection angle of the mirror from a day position to a night position or vice-versa.

3. A multiple position day-night rearview mirror assembly according to claim 2, in which:
   one plate has a depending leg portion having its extremity in opposed spaced relationship to the extremity of a depending leg portion on the other plate,
   and the plate separating link means comprises a crank means having a first crank portion in abutting relation to a surface of the cylindrical body member and a second crank portion interposed between the opposed extremities of said depending leg portions,
   said crank means first crank portion being responsive to axial movement of the cylindrical body member to cause the second crank portion to spread said depending leg portions and thereby decrease the gripping pressure of the plates on the ball of the ball-type supporting member.

4. A multiple position day-night rearview mirror assembly according to claim 1, in which:
one plate has a depending leg portion having its extremity in opposed spaced relationship to the extremity of a depending leg portion of the other plate, and the plate separating link means comprises a crank means having a first crank portion in abutting relation to a surface of the cylindrical body member and a second crank portion interposed between the opposed extremities of said depending leg portions, said crank means first crank portion being responsive to axial movement of the cylindrical body member to cause the second crank portion to spread said depending leg portions and thereby decrease the gripping pressure of the plates on the ball of the ball-type supporting member.

References Cited

UNITED STATES PATENTS

| | | | |
|---|---|---|---|
| 2,969,714 | 1/1961 | Cousino | 248—481 |
| 3,439,977 | 4/1969 | Meade | 350—281 |

PAUL R. GILLIAM, Primary Examiner